Patented Dec. 9, 1952

2,621,217

UNITED STATES PATENT OFFICE 2,621,217

MANUFACTURE OF SPONGE RUBBER

Roswell H. Ewart, Bloomfield, N. J., assignor to United States Rubber Company, New York, N. Y., a corporation of New Jersey No Drawing. Application June 24, 1949, Serial No. 101,251

2 Claims. (Cl. 260—723)

The invention relates to the manufacture of sponge rubber and more particularly to the manufacture of sponge rubber from natural rubber latex.

Sponge rubber is commonly made by preparing a fluid latex foam containing soap, vulcanizing and compounding ingredients, and a gelling agent, converting the foam into the desired shape as by pouring in molds or spreading on a traveling belt, permitting the shaped foam to set to an irreversible gel, and vulcanizing at elevated temperature to form sponge rubber.

It has been found that alkali-metal stearate soaps when added to natural rubber latex give a foam, in a conventional whipping apparatus, of very fine cellular structure. However, this fine cellular structure becomes coarsened before gelling when the usual necessary vulcanizing and compounding ingredients are added to the liquid latex or the foam. The compounding ingredient which effects this coarsening, is apparently the zinc oxide, since if zinc oxide is omitted from the conventional vulcanizing ingredients in preparing the whipped foam from the compounded latex, the fine cellular structure of the foam is no longer adversely affected, or if a natural rubber latex comprising only alkali-metal stearate and zinc oxide is whipped to a foam, foam collapse occurs almost immediately after the whipping is stopped. It is usually necessary that relatively large amounts of zinc oxide be present, e. g., 2 to 8 parts of zinc oxide per 100 parts of latex solids in the compounding recipe, in order to insure good vulcanization of the final rubber sponge.

That the coarsening of the foam is not altogether due to the presence of ammonia in the conventional ammonia preserved latex, which together with zinc oxide is known to produce destabilizing or coagulating zinc ammonia complex ions, is shown by the continued destabilizing action of zinc oxide even when substantially all the free ammonia is removed from the latex, as by aeration or metathetical reaction with formaldehyde.

According to the present invention, I have found that if 1 to 20 parts of alkali-metal (sodium or potassium) sulfide per 100 parts of zinc oxide is incorporated in the latex compound, the fine cellular structure imparted to the latex by the alkali-metal stearate soap foaming agent will be maintained through the shaping, gelling and vulcanizing steps to the final sponge rubber product.

In carrying out the present invention, natural rubber latex is compounded with 0.5 to 5 parts, per 100 parts of latex solids, of alkali-metal stearate, as a foaming agent to give the fine cellular foam structure, and 2 to 8 parts per 100 parts of latex solids of zinc oxide for satisfactory vulcanization with the conventional sulfur and vulcanizing accelerators. There is also added to the latex 1 to 20 parts of alkali-metal sulfide per 100 parts of zinc oxide used, which will satisfactorily maintain the fine cellular structure of the foam imparted by the alkali-metal stearate soap through the various operations to the final sponge product. The latex compound may be whipped to a foam of the desired density, and the foam gelled and vulcanized in the usual manner. A gelling agent, such as an alkali-metal silicofluoride, may be added to the latex before foaming or to the foamed latex before molding, and thus be made to cause gelling of the foam at room or elevated temperatures. It is also known to gel the foam by freezing, or by high frequency dielectric heating, or by low frequency alternating electric current.

The term "latex" or "natural rubber latex" in the present specification and claims, refers to Hevea rubber latex. If the latex is preserved with ammonia, as is common in many commercial latices, it is desirable to reduce the ammonia content of the latex to below 0.20% and preferably to below .50% before compounding and foaming. Where an alkali-metal silicofluoride gelling agent, such as sodium silicofluoride, is used, the amount is generally from .5 to 5 parts per 100 parts of latex solids. The sulfur, accelerator, and antioxidant will be present in conventional amounts, as 0.2 to 4.0 parts of sulfur, 0.2 to 3.0 parts of accelerator, and 0.0 to 3.0 parts of antioxidant per 100 parts of latex solids. All parts referred to herein are by weight. As may be seen from the relative proportions of alkali-metal sulfide to zinc oxide, less alkali-metal sulfide is used than that which would be required to metathetically react with all the zinc oxide present to form insoluble zinc sulfide. At least one part of alkali-metal sulfide per 100 parts of zinc oxide is necessary to prevent coarsening of the cellular foam structure. As much as 20 parts of sodium sulfide may be used per 100 parts of zinc oxide; greater amounts of sulfide tend to slow down vulcanization of the latex, and interfere with foam stability.

The following illustrates the present invention:

A commercial concentrated (creamed) latex of 67.2% total solids concentration and containing 0.6% of ammonia based on the latex as a preservative, was aerated to reduce the ammonia to .01% based on the latex. 149 parts of the latex (containing 100 parts of solids) were compounded with 2 parts of potassium stearate, 0.2 part of sodium sulfide, 5 parts of zinc oxide, 2.5 parts of sulfur, 2 parts of accelerator, and 1 part of antioxidant. These ingredients were added in the form of aqueous solutions or pastes in the conventional manner, and water was added to the finally compounded latex to a total solids concentration of 60%. The compounded latex was then frothed in a whipper of a conventional Hobart mixer type, giving an extremely fine cell cellular structure. At the end of the whipping of air into the latex 4.5 parts of a 50% aqueous sodium silico-fluoride solution were added to the foam which was then poured into a mold where it gelled in 5½ minutes from the time the sensitizer was added. The gelled foam was then cured, giving a spronge rubber with extremely fine cell size and continuous even texture. It is preferably to reduce the ammonia content of the latex to a low amount, generally less than 0.2%, as higher amounts of the ammonia tend to cause a buffering action to take place in the pH region where the froth is set, leading to unstable foam with the possibility of poor foam structure on vulcanization of an incompletely gelled or unstable foam. As is known, the length of time the latex is whipped determines the density of the sponge, and the amount and kind of gelling agent determines the setting time. Froths produced according to the present process are extremely stable and as seen from the above example, long setting times have no adverse effect on the sponge structure. For example, a frothed latex containing .3 part of potassium sulfide, instead of the .2 part in the above example, had a setting time of 32 minutes with no ill effect on the foam structure on vulcanizing after this setting and gelling period.

In view of the many changes and modifications that may be made without departing from the principles underlying the invention, reference should be made to the appended claims for an understanding of the scope of the invention.

Having thus described my invention, what I claim and desire to protect by Letters Patent is:

1. The method of making sponge rubber from ammonia-preserved natural rubber latex which comprises reducing the free-ammonia content of the latex to below 0.2%, compounding the latex with 0.5 to 5 parts of alkali metal stearate per 100 parts of latex solids, 2 to 8 parts of zinc oxide per 100 parts of latex solids, and 1 to 20 parts of alkali-metal sulfide per 100 parts of zinc oxide, whipping air into the compounded latex to form a fluid foam, shaping the foam, permitting the foam to gel, and vulcanizing to form sponge rubber.

2. The method of making sponge rubber from ammonia-preserved natural rubber latex which comprises reducing the free-ammonia content of the latex to below 0.2%, compounding the latex with 0.5 to 5 parts of alkali-metal stearate per 100 parts of latex solids, 2 to 8 parts of zinc oxide per 100 parts of latex solids, and 1 to 20 parts of alkali-metal sulfide per 100 parts of zinc oxide, whipping air into the compounded latex to form a fluid foam, adding 0.5 to 5 parts of alkali-metal silicofluoride per 100 parts of latex solids to the foam, shaping the foam, permitting the foam to gel, and vulcanizing to form sponge rubber.

ROSWELL H. EWART.

REFERENCES CITED

The following references are of record in the file of this patent:

UNITED STATES PATENTS

| Number | Name | Date |
|---|---|---|
| 1,926,285 | Holmberg et al. | Sept. 12, 1933 |
| 2,313,464 | Clayton | Mar. 9, 1943 |
| 2,321,111 | Stamberger | June 8, 1943 |
| 2,321,957 | Twiss et al. | June 15, 1943 |
| 2,426,430 | Binns | Aug. 26, 1947 |
| 2,484,434 | Van Buskirk et al. | Oct. 11, 1949 |